United States Patent
Ono et al.

(10) Patent No.: US 11,953,714 B2
(45) Date of Patent: Apr. 9, 2024

(54) OPERATING UNIT AND AMUSEMENT MACHINE

(71) Applicant: OMRON Corporation, Kyoto (JP)

(72) Inventors: Takahiro Ono, Kyoto (JP); Tatsuya Adachi, Kyoto (JP)

(73) Assignee: OMRON CORPORATION, Kyoto (JP)

(*) Notice: Subject to any disclaimer, the term of this patent is extended or adjusted under 35 U.S.C. 154(b) by 0 days.

(21) Appl. No.: 17/870,884

(22) Filed: Jul. 22, 2022

(65) Prior Publication Data
US 2023/0041435 A1    Feb. 9, 2023

(30) Foreign Application Priority Data

Aug. 5, 2021 (JP) .................. 2021-129153

(51) Int. Cl.
*F21V 8/00* (2006.01)
*G07F 17/32* (2006.01)

(52) U.S. Cl.
CPC ........... *G02B 6/006* (2013.01); *G02B 6/0068* (2013.01); *G02B 6/0076* (2013.01); *G07F 17/3209* (2013.01)

(58) Field of Classification Search
CPC .... G02B 6/006; G02B 6/0068; G02B 6/0075; G02B 6/0076; G07F 17/3209; H01H 9/182; H01H 2009/183; H01H 2209/082; H01H 2209/038; H01H 2219/062; H01H 2221/07; H01H 2231/008; H01H 13/83; A63F 2003/00646; A63F 2003/00652; A63F 2003/00659
See application file for complete search history.

(56) References Cited

U.S. PATENT DOCUMENTS

| | | | | |
|---|---|---|---|---|
| 4,408,762 A | * | 10/1983 | Brey | G07F 17/3297 273/121 A |
| 11,515,107 B2 | * | 11/2022 | Chen | G02B 6/0083 |
| 2011/0085109 A1 | * | 4/2011 | Kim | G02F 1/13476 349/62 |
| 2011/0194167 A1 | * | 8/2011 | Jackson | G09F 13/18 359/290 |
| 2012/0235837 A1 | * | 9/2012 | Tsai | H01H 13/83 341/22 |
| 2016/0335845 A1 | | 11/2016 | Onoyama et al. | |
| 2019/0122486 A1 | * | 4/2019 | Onoyama | G09G 3/32 |
| 2019/0122489 A1 | * | 4/2019 | Onoyama | F21V 33/008 |
| 2020/0074895 A1 | * | 3/2020 | Liang | G02B 6/0076 |
| 2020/0319391 A1 | * | 10/2020 | Vasylyev | G02B 6/005 |
| 2021/0149102 A1 | * | 5/2021 | Ho | G02B 6/0076 |

FOREIGN PATENT DOCUMENTS

JP    2016-214319 A    12/2016

* cited by examiner

*Primary Examiner* — Alexander K Garlen
(74) *Attorney, Agent, or Firm* — METROLEX IP LAW GROUP, PLLC (57) ABSTRACT

An operating unit according to one or more embodiments may include a base and switches on the base. The base according to one or more embodiments may include a first light emitter including at least one light guide plate finely processed with a pattern and having a light emitting surface facing a front surface of the operating unit, and a light emitting board on an end face of the at least one light guide plate in a thickness direction. The light emitting board applies light to the at least one light guide plate.

15 Claims, 10 Drawing Sheets

OPERATING UNIT AND AMUSEMENT MACHINE

CROSS-REFERENCE TO RELATED APPLICATION

This application claims priority to Japanese Patent Application No. 2021-129153 filed on Aug. 5, 2021, the contents of which are incorporated herein by reference.

FIELD

The present disclosure relates to an operating unit installed in an amusement machine such as a pachinko slot machine, a slot machine, and a gaming machine and to the amusement machine.

BACKGROUND

Amusement machines such as pachinko slot machines, slot machines, and gaming machines include an operating unit installed at a position to appear conspicuous on the front face of the machine for direct operation by players. The operating unit is to be designed to appeal to players.

Known operating units include a display device such as a liquid crystal display (LCD) device to display any image. The display device is incorporated in a base in which an operable portion such as switches is located for enhancing presentation effects. A known operating unit can produce light presentation using light sources placed around switches to illuminate around the switches (Patent Literature 1).

CITATION LIST

Patent Literature

Patent Literature 1: Japanese Unexamined Patent Application Publication No. 2016-214319

SUMMARY

However, display devices to display any image are expensive. The price of a product incorporating such a display device tends to rise. In contrast, an operating unit that illuminates around switches is less expensive than an operating unit incorporating a display device. However, such an operating unit has light presentation without using the entire base and thus may be improved.

One or more embodiments are directed to an operating unit and an amusement machine having an inexpensive structure that may produce light presentation with an impact.

An operating unit according to one or more embodiments includes a base and an operable portion on the base. The base includes a first light emitter including at least one light guide plate finely processed with a pattern and having a light emitting surface facing a front surface of the operating unit, and a light emitting board on an end face of the at least one light guide plate in a thickness direction. The light emitting board applies light to the at least one light guide plate.

In the above structure, once the light emitting board applies light to the light guide plate to cause the light guide plate to emit light, the pattern shaped through fine processing is illuminated to display, as a light image, the characters and designs drawn in the pattern on the base. Light emitted from the light image displayed on the light guide plate is more luminous than light emitted from the screen of an LCD device to provide an impact to players. The light guide plate is transparent when emitting no light. No pattern is visible. Well-modulated light presentation may thus be performed using a light image that appears suddenly when the light guide plate emits light and disappears suddenly when the light guide plate emits no light.

The above identified structure may allow the operating unit having an inexpensive structure to produce light presentation with an impact, without using an expensive display device such as an LCD device.

In the operating unit according to one or more embodiments, the first light emitter may include a plurality of the light guide plates. The plurality of light guide plates may include different patterns and may be stacked on one another.

In the above structure, the first light emitter includes the multiple light guide plates having mutually different patterns that are illuminated and displayed. The display is thus switchable by switching between the light guide plates that emit light. The multiple light guide plates may simultaneously emit light to display combined different patterns. The above identified structure may allow more complex characters and designs to appear to provide a greater impact to players.

In the operating unit according to one or more embodiments, the base may include a second light emitter including at least one transparent board stacked on the at least one light guide plate and having a surface on which a plurality of light emitting elements are mounted, and a light control board that controls light emission of the plurality of light emitting elements.

In the above structure, the display of characters and designs using the light guide plates in the first light emitter may be combined with the display performed by the multiple light emitting elements mounted on the transparent board in the second light emitter. The above identified structure may allow more complex characters and designs to appear to provide a greater impact to players. The light emitting elements may be mounted at any positions on the transparent board. Any character or pattern may thus be displayed depending on the arrangement of the light emitting elements.

In the operating unit according to one or more embodiments, the second light emitter may include a plurality of the transparent boards. A transparent plate may be located between adjacent transparent boards of the plurality of transparent boards to maintain a spacing between the adjacent transparent boards.

In the above structure, the multiple transparent boards on which the light emitting elements are mounted include adjacent transparent boards spaced from each other with the transparent plate. The display performed by the light emitting elements on the transparent boards thus has more depth due to the difference in height positions of the transparent boards to have a more complex display performed by the second light emitter. The above identified structure may provide a greater impact to players.

In the operating unit according to one or more embodiments, the base may include a first mirror located adjacent to a light emission surface of the first light emitter to reflect and transmit light and a second mirror located adjacent to a back surface of the first light emitter to reflect light.

In the above structure, the first mirror and the second mirror are located to sandwich the first light emitter to form an infinity mirror. The infinity mirror effectively may allow players to perceive depth in the display performed by the first light emitter 12 to provide a greater impact to the players.

In the operating unit according to one or more embodiments, the base may include a first mirror located adjacent to a light emission surface of each of the first light emitter and the second light emitter to reflect and transmit light and a second mirror located adjacent to a back surface of each of the first light emitter and the second light emitter to reflect light.

In the above structure, the first mirror and the second mirror are located to sandwich the first and second light emitters to form an infinity mirror. The infinity mirror effectively may allow players to perceive depth in the display performed by the first light emitter 12 to provide a greater impact to the players. In particular, the display performed by the second light emitter in which the light from the light emitting elements is directly visible may provide a still greater impact to players, with the point light corresponding to each light emitting element appearing to extend continuously or intermittently in the depth direction (backward).

An amusement machine according to one or more embodiments includes the operating unit according to one or more embodiments.

The amusement machine with the above identified structure may include the operating unit having an inexpensive structure to produce light presentation with an impact, without using an expensive display device such as an LCD device.

The operating unit and the amusement machine according to one or more embodiments have an inexpensive structure that may produce light presentation with an impact.

DETAILED DESCRIPTION

One or more embodiments will now be described with reference to the drawings. One or more embodiments described below are a mere examples in any aspect. One or more embodiments may be variously modified or altered without departing from the scope of the invention. More specifically, one or more embodiments may be implemented as appropriate using the structure specific to each embodiment.

1. Example Use

One example use of one or more embodiments will now be described with reference to FIGS. 1, 2, 4, and 5.

Figure 1:
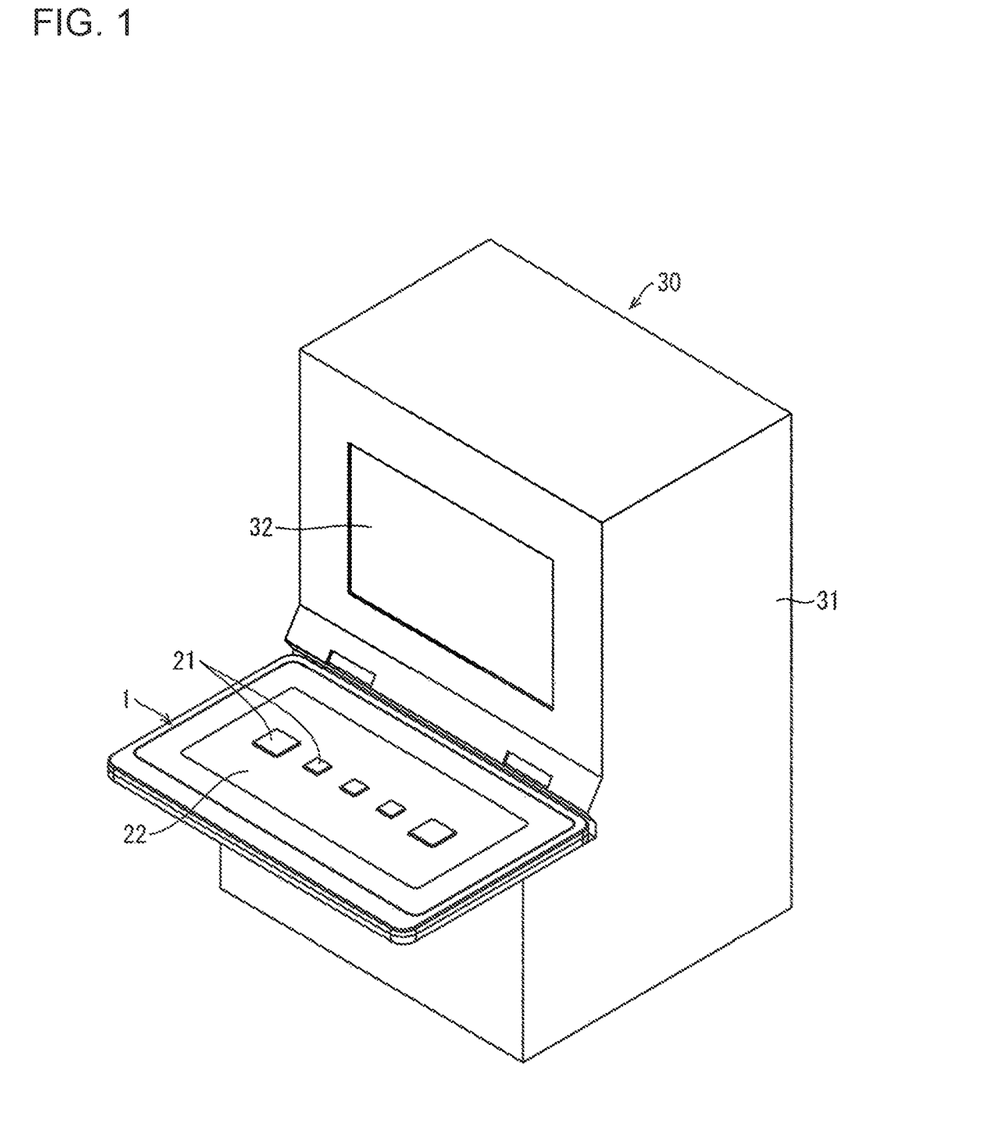
FIG. 1 is a schematic diagram illustrating a perspective view of an operating unit and an amusement machine according to a first embodiment or a second embodiment.

As shown in FIG. 1, an amusement machine 30 includes a housing 31, a display unit 32 at the front face of the housing 31, and an operating unit 1 below the display unit 32. The operating unit 1 includes a base 22 and switches (operable portion) 21 included in the base 22.

Figure 2:
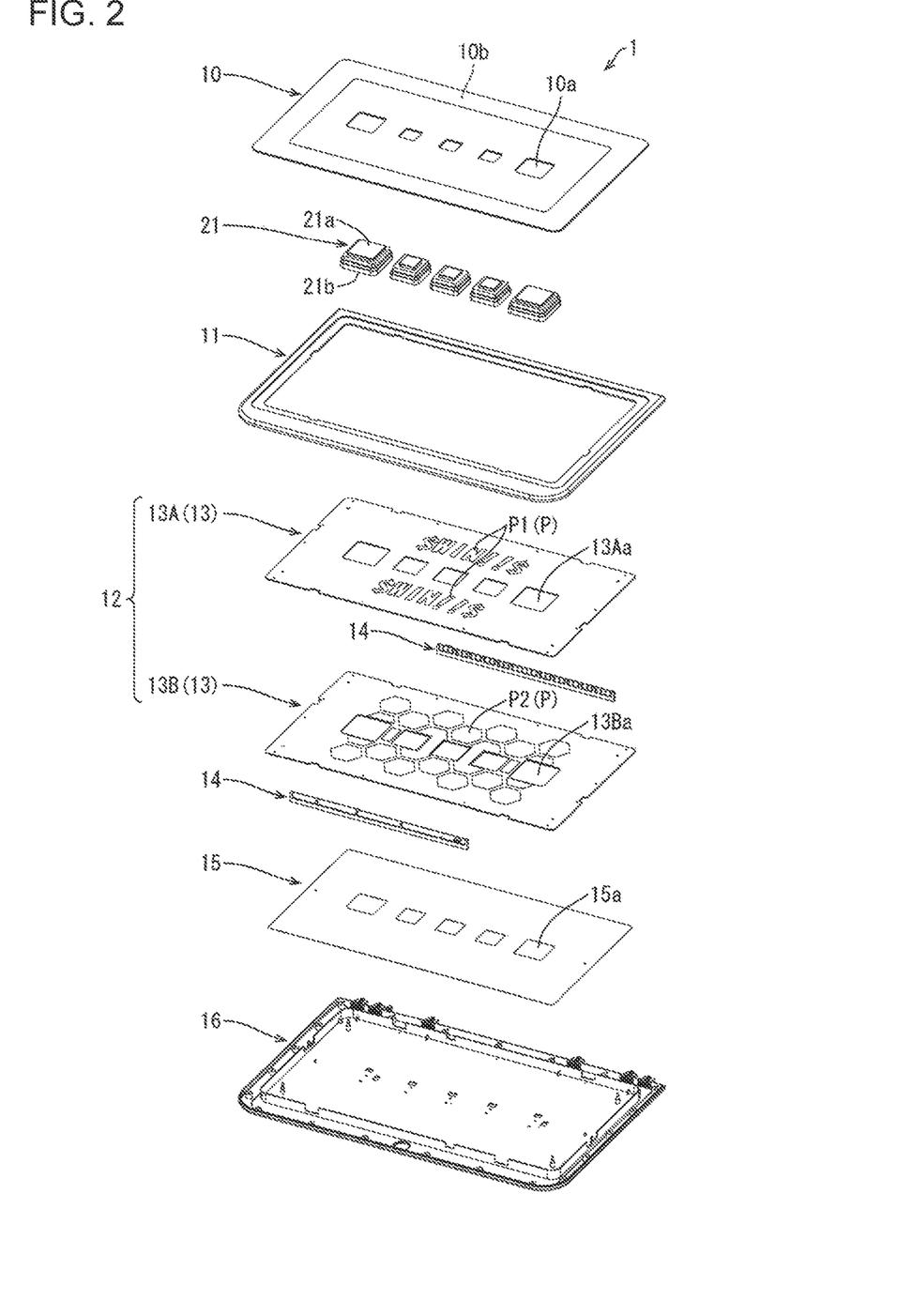
FIG. 2 is a diagram illustrating an exploded perspective view of an operating unit according to a first embodiment.

As shown in FIG. 2, the base 22 includes a first light emitter 12 and light emitting boards 14 for light guide plates. The first light emitter 12 includes at least one light guide plate 13 and includes a first light guide plate 13A and a second light guide plate 13B in the present embodiment or embodiments. The light emitting boards 14 are located on the end faces of the first light guide plate 13A and the second light guide plate 13B in their thickness directions and apply light to the first light guide plate 13A and the second light guide plate 13B.

Figure 4:
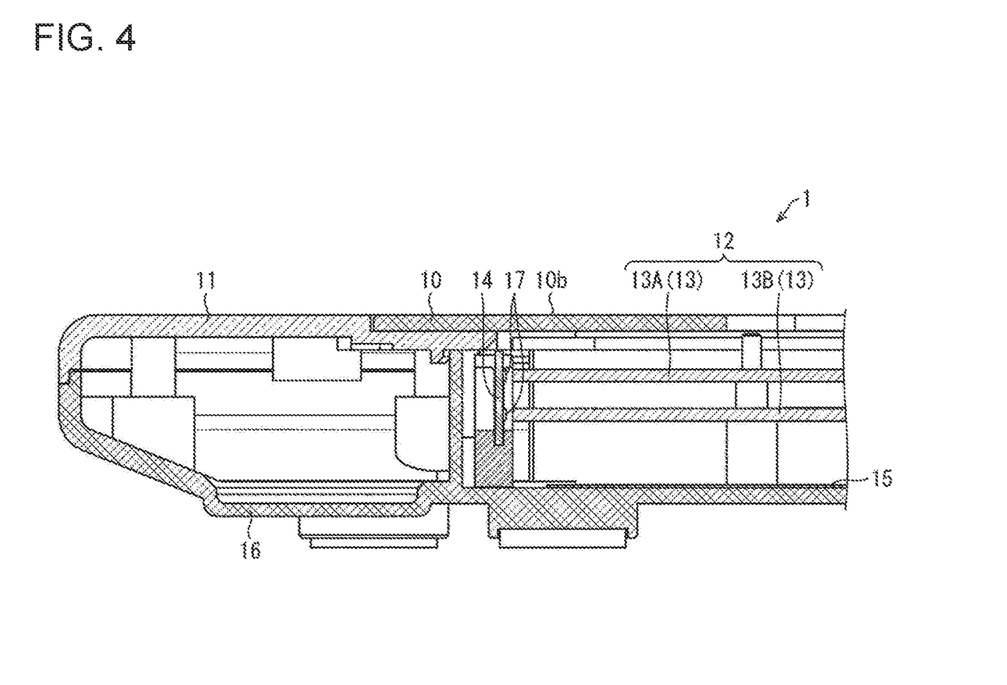
FIG. 4 is a diagram illustrating an enlarged view of an area B1 shown in FIG. 3.

The first light guide plate 13A and the second light guide plate 13B are finely processed with patterns P1 and P2 representing any characters and designs. As shown in FIG. 4, each light emitting board 14 includes light sources 17. Light from the light sources 17 is directed inside the first light guide plate 13A and the second light guide plate 13B, causing the first light guide plate 13A and the second light guide plate 13B to emit light.

Figure 5:
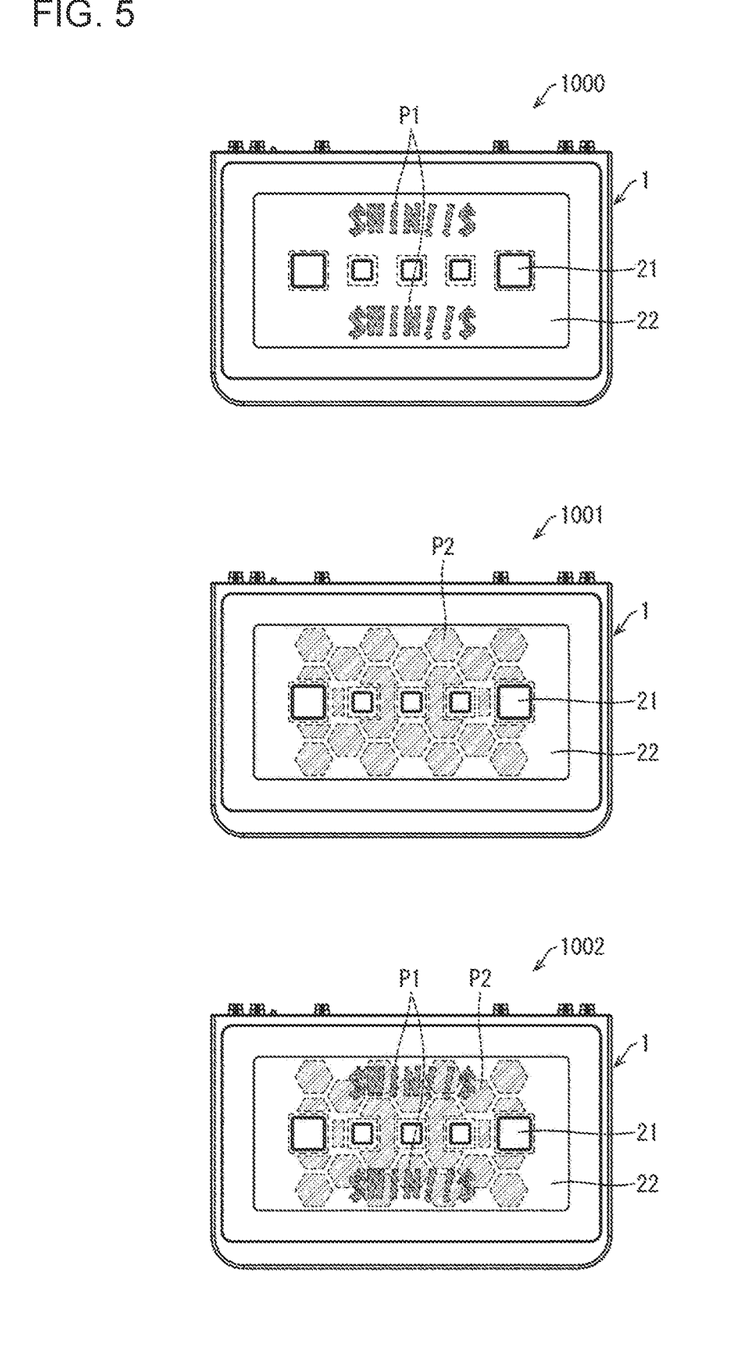
FIG. 5 is a diagram illustrating light presentation performed by a first light emitter in an operating unit according to a first embodiment.

The applied light propagates inside the first light guide plate 13A and the second light guide plate 13B and is partly reflected from uneven surfaces that are finely processed to change the optical path, causing the first light guide plate 13A and the second light guide plate 13B to emit light from their surfaces (light emitting surface). As shown in FIG. 5, the emitted light illuminates the patterns P1 and P2 that are shaped through fine processing to be visible.

FIG. 1 shows a slot machine as an example of the amusement machine 30. The operating unit 1 is usable in various amusement machines such as a pachinko slot machine and a gaming machine. The operating unit 1 can be also used as operating units for industrial equipment and consumer equipment.

First Embodiment

One or more embodiments will now be described in detail.

2. Example Structure

First Embodiment

The first embodiment in one or more embodiments will now be described with reference to FIGS. 1, 2, 3, 4, and 5.
Structure of Operating Unit 1

FIG. 1 is a schematic perspective view of the operating unit 1 and the amusement machine 30 according to the present embodiment or embodiments.

Figure 3:
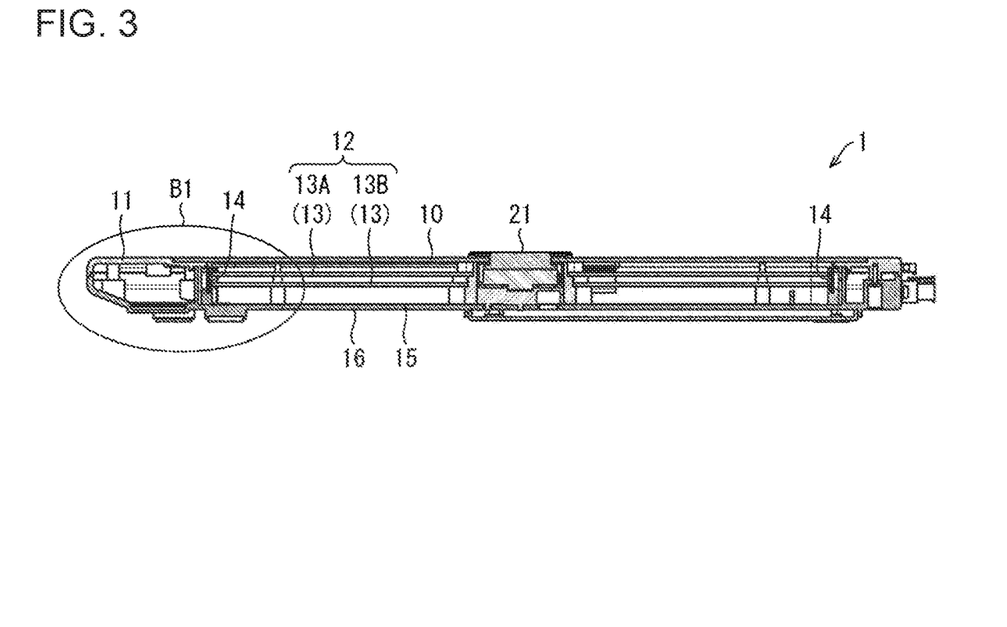
FIG. 3 is a diagram illustrating a longitudinal sectional view of an operating unit according to a first embodiment.

FIG. 2 is an exploded perspective view of the operating unit 1 according to the present embodiment or embodiments. FIG. 3 is a longitudinal sectional view of the operating unit 1, which is rectangular, according to the present embodiment or embodiments in its transverse direction. FIG. 4 is an enlarged view of an area B1 shown in FIG. 3.

As shown in FIGS. 1, 2, 3, and 4, the operating unit 1 includes the base 22 and the switches (operable portion) 21 located in the base 22. In the present embodiment or embodiments, the base 22 is rectangular and includes the five switches 21 arranged in the structure shown in the example.

The switches 21 are, for example, push switches. Each switch 21 includes a top 21a and a case 21b. The top 21a is urged upward and moves up and down relative to the case 21b (refer to FIG. 2). The operating unit 1 includes an input detector (not shown) that detects an operation on any of the switches 21. For the operating unit 1 installed in a slot machine as an amusement machine, the switches 21 serve as bet buttons for specifying a bet (number of bets) and spin buttons for instructing the start of a spin.

The base 22 includes a top panel 10, a cover 11, the first light emitter 12, the light emitting boards 14, a mirror panel 15, and a bottom base 16.

The first light emitter 12 includes at least one light guide plate 13 having a light emitting surface facing the front surface of the operating unit 1. The operating unit 1 has the front surface with the top panel 10, and has the back surface (rear surface) with the bottom base 16. The light guide plate 13 is a transparent thin plate and is formed from a light-transmissive material such as an acrylic resin or glass. The light guide plate 13 is finely processed with grooves in a pattern P with, for example, characters and designs on the back surface of the light guide plate 13.

In the present embodiment or embodiments, the first light emitter 12 includes the first light guide plate 13A and the second light guide plate 13B (multiple light guide plates 13) stacked on each other. As shown in FIG. 2, the first light guide plate 13A and the second light guide plate 13B have different patterns P1 and P2. The first light guide plate 13A has openings 13Aa, and the second light guide plate 13B has openings 13Ba. The openings 13As and 13Ba are aligned with the switches 21. Each opening is larger than the case 21b in the corresponding switch 21

Each light emitting board 14 is located at the corresponding end faces (end faces in the thickness direction) of the first light guide plate 13A and the second light guide plate 13B. Each light emitting board 14 receives the light sources 17 on its surface facing the corresponding end faces of the first light guide plate 13A and the second light guide plate 13B (refer to FIG. 4). Light-emitting diodes (LEDs) are examples of the light sources 17. For full-color LEDs, the emission colors of the first light guide plate 13A and the second light guide plate 13B are changeable to various colors. Each light emitting board 14 can drive the mounted light sources 17 individually and independently.

In the present embodiment or embodiments, the two light emitting boards 14 are located at both end faces of the first light guide plate 13A and the second light guide plate 13B in the transverse directions of the first light guide plate 13A and the second light guide plate 13B. The two light emitting boards 14 face each other. The above identified structure allows light to be applied to both end faces of the first light guide plate 13A and the second light guide plate 13B in their transverse directions.

The top panel 10 is a transparent cover located at the front surface of the operating unit 1. The top panel 10 is formed from a colorless, transparent material such as a polycarbonate resin, an acrylic resin, or glass. The top panel 10 has openings 10a aligned with the switches 21. Each opening 10a is smaller than the case 21b in the corresponding switch 21, allowing the top 21a alone to protrude (refer to FIG. 2). The top panel 10 undergoes a black printing 10b (refer to FIG. 2) performed around the peripheral edge on its back surface to hide the internal structure of the operating unit 1 around its peripheral edge.

In the present embodiment or embodiments, the top panel 10 undergoes half mirror vapor deposition on its entire back surface. The top panel 10 thus has both the light reflecting function and the light transmitting function, or specifically has the half mirror function. The top panel 10 with the half mirror function serves as one mirror (first mirror) of the infinity mirror. The half mirror vapor deposition is also applied on the black printing 10b. The half mirror function may be provided by a method other than vapor deposition, such as attaching a half mirror film to the top panel 10.

The mirror panel 15 undergoes mirror vapor deposition. The mirror panel has the light reflecting function and serves as the other mirror (second mirror) of the infinity mirror. The mirror panel 15 may be formed by a method other than vapor deposition, such as attaching a mirror film. The mirror panel 15 has openings 15a aligned with the switches 21. Each opening 15a is larger than the case 21b in the corresponding switch 21 (refer to FIG. 2).

The bottom base 16 is a housing located on the back surface (rear surface) of the operating unit 1. As shown in FIGS. 2, 3, and 4, the bottom base 16 receives the mirror panel 15, the second light guide plate 13B, and the first light guide plate 13A in the described order. The two light emitting boards 14 are at any positions on the sides of the first light guide plate 13A and the second light guide plate 13B received in the bottom base 16. The switches 21 are placed inside the corresponding openings 10a, 13Aa, 13Ba, and 15a. After the switches 21 are placed, the cover 11 that is a frame is fitted to the bottom base 16 from above, and the cover 11 and the bottom base 16 are fastened with, for example, screws (not shown). The top panel 10 is then placed to allow each switch 21 to be inside the corresponding opening 10a, and is bonded at its bottom outer periphery to the cover 11 with, for example, double-sided tape.

In the assembled state as shown in FIG. 3, spaces are left between the top panel 10 and the first light guide plate 13A, between the first light guide plate 13A and the second light guide plate 13B, and between the second light guide plate 13B and the mirror panel 15.

Light Presentation by Operating Unit 1

In the operating unit 1, the light sources 17 on the light emitting boards 14 facing the end faces of the first light guide plate 13A are turned on to cause light to enter the first light guide plate 13A through the end faces of the first light guide plate 13A. The first light guide plate 13A thus emits light. The incident light propagates inside the first light guide plate 13A while repeating total internal reflection. The light is partly reflected from the finely processed uneven surfaces to change the light path and is emitted from the surface (emitting surface) of the first light guide plate 13A. The emitted light illuminates the pattern P1 shaped through fine processing to display the characters and designs drawn in the pattern P1 as a light image on the base 22.

In the second light guide plate 13B, the light sources 17 on the light emitting boards 14 facing the end faces of the second light guide plate 13B are turned on to cause the second light guide plate 13B to emit light, thus displaying the characters and designs drawn in the pattern P2 on the second light guide plate 13B as a light image on the base 22.

Each light emitting board 14 can drive the mounted light sources 17 individually and independently. The above identified structure allows the light sources 17 corresponding to the first light guide plate 13A alone to be turned on to cause the first light guide plate 13A alone to emit light, or the light sources 17 corresponding to the second light guide plate 13B alone to be turned on to cause the second light guide plate 13B alone to emit light. The above identified structure also allows both the light sources 17 corresponding to the first light guide plate 13A and the second light guide plate 13B to be turned on to cause the first light guide plate 13A and the second light guide plate 13B to simultaneously emit light and display a light image combining the characters and designs drawn in the patterns P1 and P2.

FIG. 5 is a diagram describing light presentation performed by the first light emitter 12 in the operating unit 1 according to the present embodiment or embodiments. The figure with reference numeral 1000 in FIG. 5 shows the structure when the first light guide plate 13A alone emits light. The figure with reference numeral 1001 in FIG. 5 shows the structure when the second light guide plate 13B alone emits light. The figure with reference numeral 1002 in FIG. 5 shows the structure when both the first light guide plate 13A and the second light guide plate 13B emit light. Increasing the number of light guide plates 13 in the first light emitter 12 allows a more complex light image to appear.

Advantageous Effects

In the operating unit 1 with the above structure, the characters and designs drawn in the pattern P are displayed as a light image on the base 22 using the light guide plate 13 (the first light guide plate 13A and the second light guide plate 13B) included in the first light emitter 12. Light emitted from the light image displayed on the light guide plate 13 is more luminous than light emitted from the screen of a liquid crystal display (LCD) device to provide an impact to players. When emitting no light, the light guide plate 13 is transparent, and the pattern P is invisible. The above identified structure can produce well-modulated light presentation using a light image that appears suddenly when the light guide plate 13 emits light and disappears suddenly when the light guide plate 13 emits no light.

The inexpensive structure with no expensive display device such as an LCD device produces light presentation with an impact.

In the above structure, the first light emitter 12 includes the first light guide plate 13A and the second light guide plate 13B to switch between the first light guide plate 13A and the second light guide plate 13B to display an illuminated object in a switchable manner. In addition, simultaneous light emission of the first light guide plate 13A and the second light guide plate 13B allows a combination of the different patterns P1 and P2 to appear. The above identified structure allows more complex characters and designs to appear to provide a greater impact to players.

In the above structure, the base 22 includes the top panel 10 adjacent to the light emitting surface of the first light emitter 12 and functioning as the half mirror and the mirror panel 15 located adjacent to the back surface of the first light emitter 12. The top panel 10 and the mirror panel 15 together serve as the infinity mirror. The infinity mirror effectively allows players to perceive depth in the display performed by the first light emitter 12 to provide a greater impact to the players.

Second Embodiment

Another embodiment in one or more embodiments will now be described. For ease of explanation, the components having the same functions as the components described in the above embodiment are given the same reference numerals as those components and will not be described.

Figure 6:
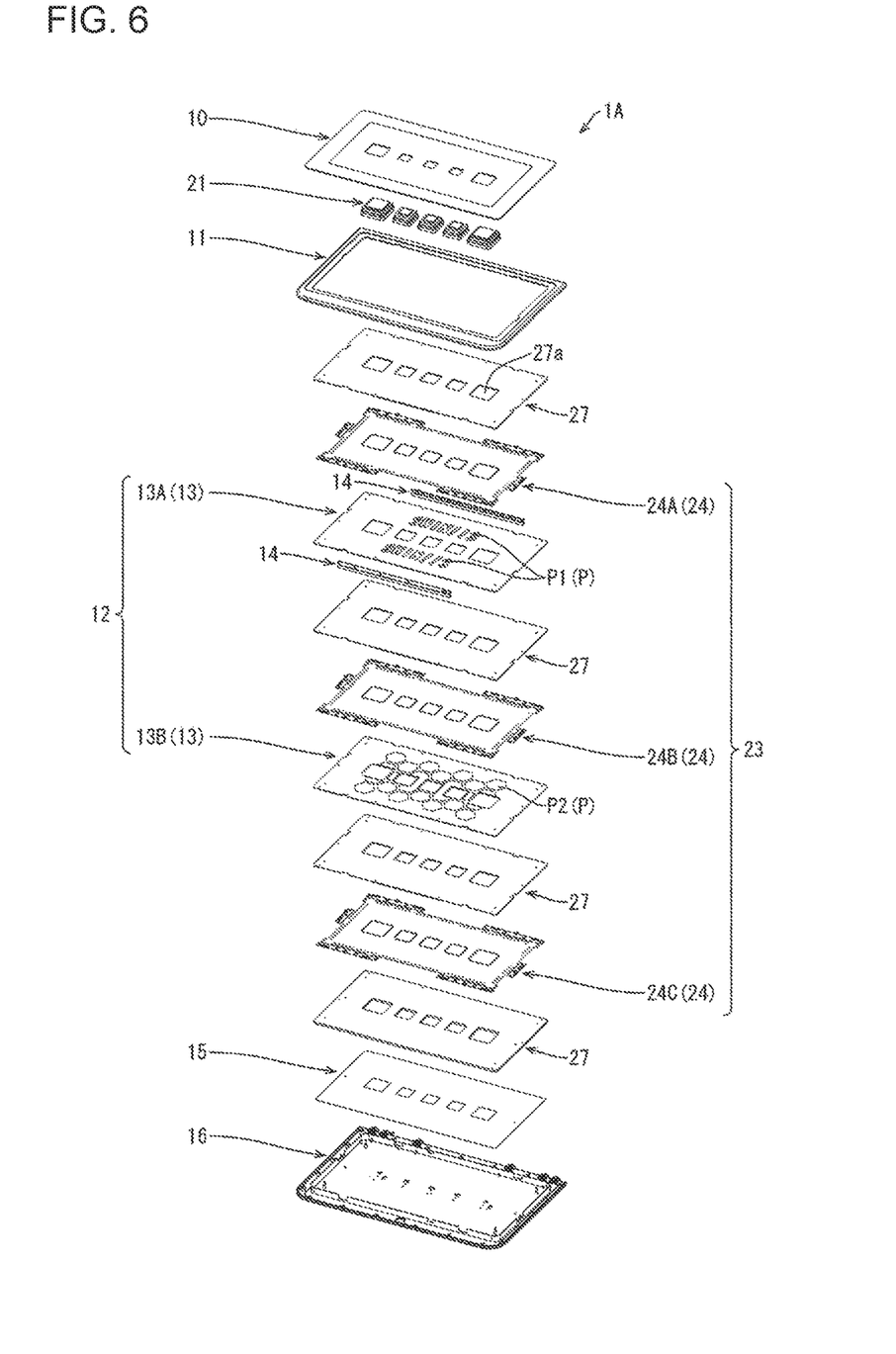
FIG. 6 is a diagram illustrating an exploded perspective view of an operating unit according to a second embodiment.
Figure 7:
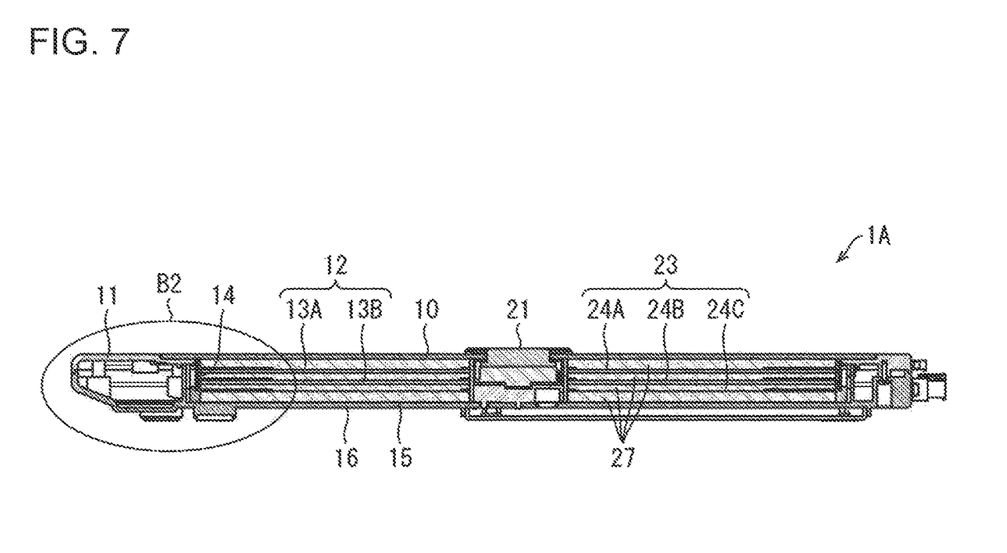
FIG. 7 is a diagram illustrating a longitudinal sectional view of an operating unit according to a second embodiment.
Figure 8:
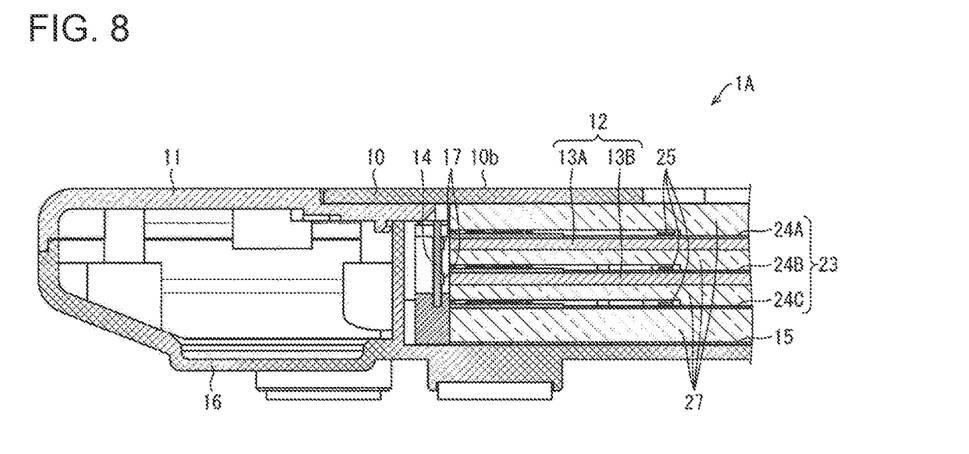
FIG. 8 is a diagram illustrating an enlarged view of an area B2 shown in FIG. 7
Figure 9:
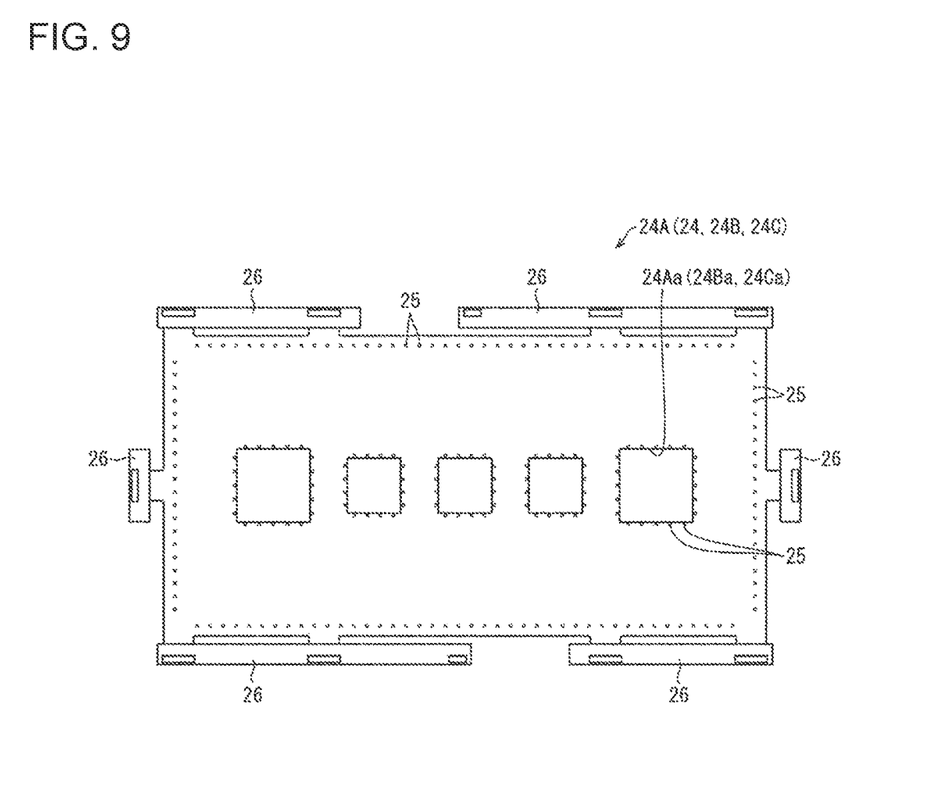
FIG. 9 is a diagram illustrating a plan view of a second light emitter and an emission control board included in an operating unit according to a second embodiment.

FIG. 6 is an exploded perspective view of an operating unit 1A according to the present embodiment or embodiments. FIG. 7 is a longitudinal sectional view of the operating unit 1A, which is rectangular, according to the present embodiment or embodiments in its transverse direction. FIG. 8 is an enlarged view of an area B2 shown in FIG. 7. FIG. 9 is a plan view of a second light emitter 23 and emission control boards 26 included in the operating unit 1A according to the present embodiment or embodiments.

As shown in FIGS. 6, 7, and 8, the operating unit 1A differs from the operating unit 1 in its second light emitter 23, emission control boards 26, and transparent plates 27, and includes the same other components as the operating unit 1.

The second light emitter 23 includes at least one transparent board 24 on which the light guide plate 13 (the first light guide plate 13A and the second light guide plate 13B) is stacked. The transparent board 24 is a wiring board including a thin transparent resin sheet such as an overhead projector (OHP) sheet.

As shown in FIG. 9, the transparent board 24 receives multiple light emitting elements 25 on its surface. LEDs are examples of the light emitting elements 25. For full-color LEDs, the emission color of the second light emitter 23 is changeable to various colors. The light emitting elements 25 can be at any positions on the transparent board 24.

As shown in FIGS. 6 and 8, the second light emitter 23 includes a first transparent board 24A, a second transparent board 24B, and a third transparent board 24C (multiple transparent boards) in the present embodiment or embodiments. The first transparent board 24A is located adjacent to the light emission surface of the first light guide plate 13A. The second transparent board 24B is located between the first light guide plate 13A and the second light guide plate 13B. The third transparent board 24C is located adjacent to the back surface of the second light guide plate 13B. The first transparent board 24A has openings 24Aa, the second transparent board 24B has openings 24Ba, and the third transparent board 24C has openings 24Ca. The openings 24Aa, 24Ba, and 24Ca are aligned with the switches 21. Each opening is larger than the case 21b in the corresponding switch 21.

In the present embodiment or embodiments, the light emitting elements 25 are mounted at the same positions on the first, second, and third transparent boards 24A, 24B, and 24C to overlap one another in a plan view. In the present embodiment or embodiments, the light emitting elements 25 are located around the openings 24Aa, 24Ba, and 24Ca and at the peripheral edge of the visible area in the base 22.

The emission control boards 26 drive the multiple light emitting elements 25 mounted on the transparent board 24. As shown in FIG. 9, the emission control boards 26 are distributed along the peripheral edge of the transparent board 24. The locations of the emission control boards 26 are not limited to the peripheral edge of the transparent board 24. The emission control boards 26 are electrically conductive with the transparent board 24 to drive the multiple light emitting elements 25.

The transparent plates 27 are transparent resin plates that each fill a space (gap). The transparent plates 27 have a thickness corresponding to the size of the space to be filled. In the present embodiment or embodiments, the transparent plates 27 are located in the spaces between the top panel 10 and the first transparent board 24A, between the first light guide plate 13A and the second transparent board 24B, between the second light guide plate 13B and the third transparent board 24C, and between the third transparent board 24C and the mirror panel 15. The transparent plates 27 are placed to appropriately maintain the spacing between the stacked components. Thus, the spacing between the real image and the imaginary images of the light emitting elements 25 and the spacing between the imaginary images are enlarged as described later when the top panel and the mirror panel 15 together serve as the infinity mirror.

The transparent plates 27 are formed from a colorless transparent material such as a polycarbonate resin, an acrylic resin, or glass. Each transparent plate 27 also has openings 27a aligned with the switches 21. Each opening is larger than the case 21b in the corresponding switch 21.

Figure 10:
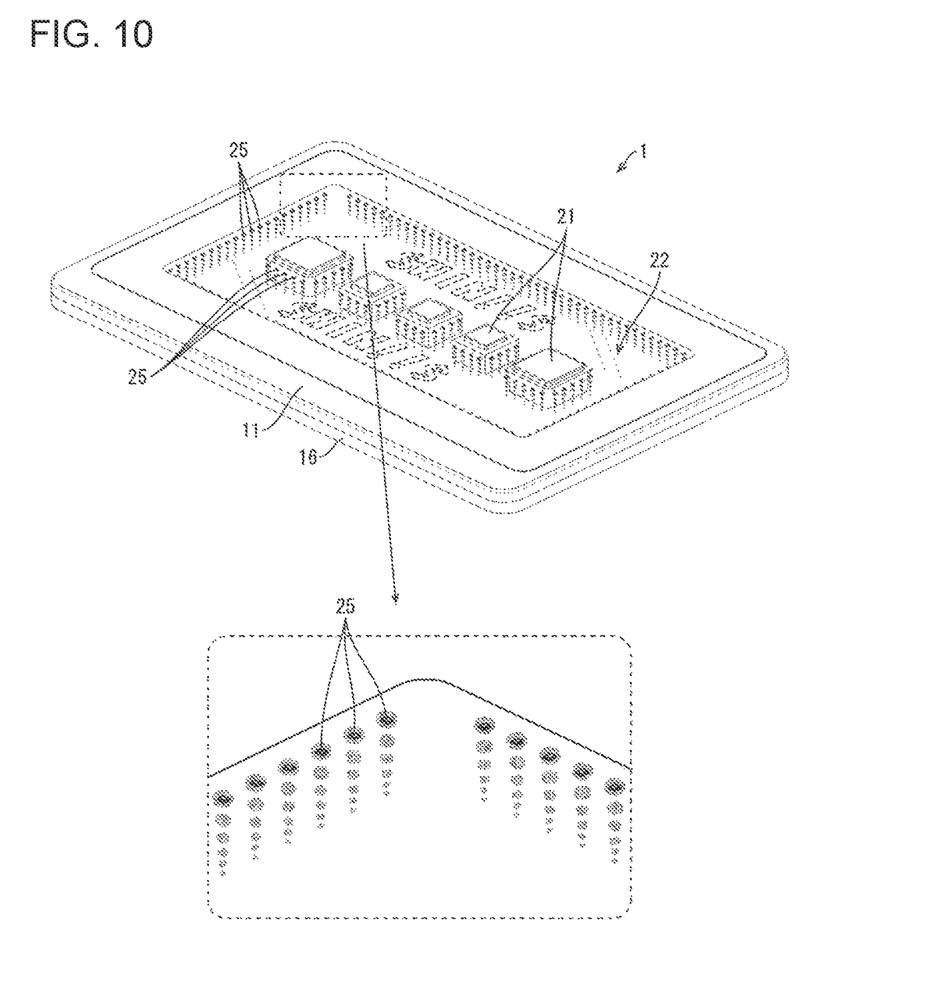
FIG. 10 is a diagram illustrating light presentation performed by a first and second light emitters included in an operating unit according to a second embodiment, including a partially enlarged view.

FIG. 10 is a diagram describing light presentation performed by the first light emitter 12 and the second light emitter 23 included in the operating unit 1A, including its partially enlarged view. The light emitting elements 25 are turned on to emit light. A user views, through the top panel 10, a real image (point light) of the light emitted from each light emitting element 25 and imaginary images (point light) of the light reflected from the mirror panel 15. Light emitted from the light emitting elements 25 is partly repeatedly reflected between the top panel 10 and the mirror panel 15 that together serve as the infinity mirror. As shown in FIG. 10, the multiple light emitting elements appear to the user to be continuously backward (in the depth direction) from the positions of the light emitting elements 25. In other words, the imaginary images of the light emitting elements 25 appear to extend continuously or intermittently in the depth direction (backward). FIG. 10 shows the structure in which the light emitting elements 25 on the first transparent board 24A alone are turned on.

Advantageous Effects

In the above structure, the display of characters and designs using the light guide plate 13 in the first light emitter 12 can be combined with the display performed by the multiple light emitting elements 25 mounted on the transparent board 24 in the second light emitter 23. The above identified structure allows more complex characters and designs to appear to provide a greater impact to players. The light emitting elements 25 can be mounted at any positions on the transparent board 24. The light emitting elements 25 can display any character or pattern.

In the above structure, the multiple transparent boards 24 on which the light emitting elements 25 are mounted include adjacent transparent boards 24 spaced from each other with the transparent plate 27. The display performed by the light emitting elements 25 on the transparent boards 24 has more depth due to the difference in height positions of the transparent boards 24 to cause the display performed by the second light emitter 23 to be more complex.

Further, in the above structure, the top panel 10 and the mirror panel 15 are located to sandwich the first light emitter 12 and the second light emitter 23 to together serve as the infinity mirror. The above identified structure allows players to perceive depth in the display performed by the first light emitter 12 and the second light emitter 23 to provide a greater impact to the players.

In particular, the display performed by the second light emitter 23, in which the light from the light emitting elements 25 is directly visible, appears to have the point light (corresponding to each light emitting element 25) extending continuously or intermittently in the depth direction (backward). The above identified structure provides users with an illusion of the operating unit 1A spreading backward and allows the players to perceive depth in the operating unit 1A. The above identified structure can provide a still greater impact to the players.

In the above structure, the light emitting elements 25 are located around the openings 24Aa, 24Ba, and 24Ca and at the peripheral edge of the visible area in the base 22. As shown in FIG. 10, the light emitting elements 25 can be combined without interfering with the light presentation performed by the first light emitter 12. The light emitting elements 25 in the second light emitter 23 are visible as grains when the light emitting elements 25 are turned off. However, the light emitting elements 25 are along the peripheries of the switches 21 and along the inside of the cover 11 and are thus less noticeable.

Third Embodiment

Another embodiment in one aspect of the present invention will now be described with reference to FIGS. 11 and 12. For ease of explanation, the components having the same functions as the components described in the above embodiments are given the same reference numerals as those components and will not be described.

In the present embodiment or embodiments, a basic operation associated with the presentation performed between the operating unit 1 according to the first embodiment or the operating unit 1A according to the second embodiment described above and the amusement machine 30 including either the operating unit 1A or the operating unit 1A will be described. FIG. 11 is a block diagram of the operating units 1 or 1A and the amusement machine 30. FIG. 12 is a flowchart of a basic procedure for presentation performed between either the operating unit 1 or 1A and the amusement machine 30.

Figure 11:
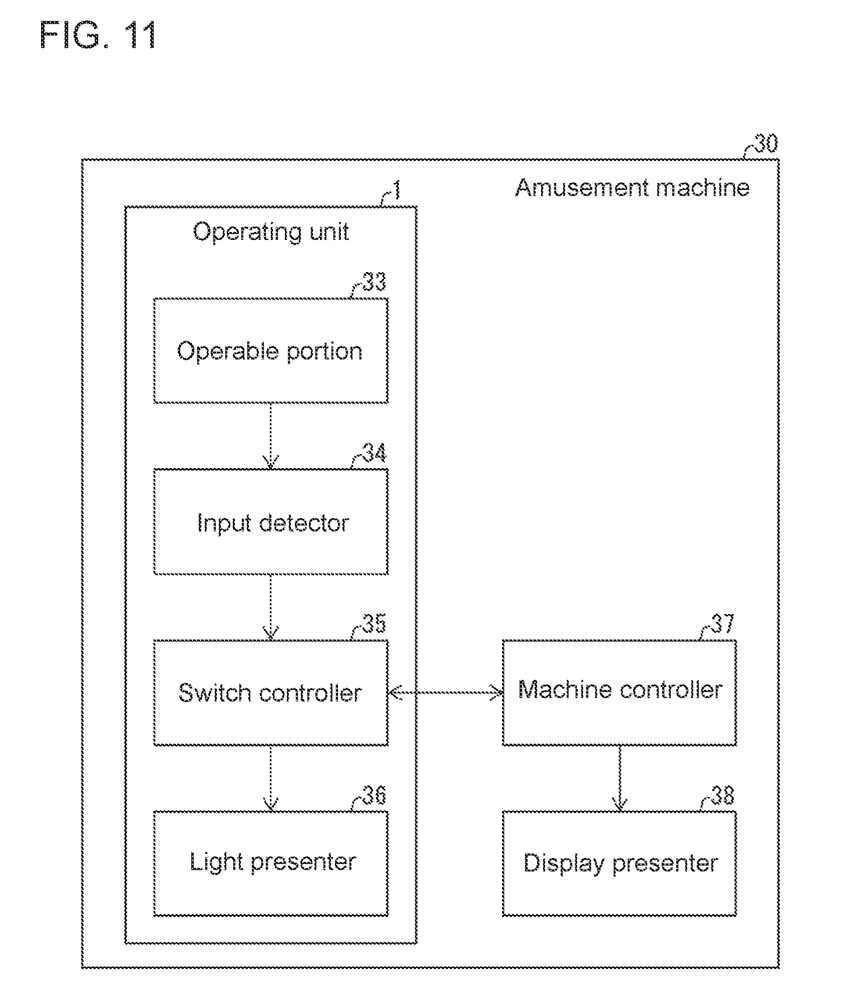
FIG. 11 is a block diagram illustrating an operating unit according to a first embodiment or a second embodiment, or other embodiments, and an amusement machine.

As shown in FIG. 11, the amusement machine 30 includes a machine controller 37, a display presenter 38, and the operating unit 1 described above. The display presenter 38 is, for example, the display unit 32 of the amusement machine 30 shown in FIG. 1. The operating unit 1 includes an operable portion 33, an input detector 34, a switch controller 35, and a light presenter 36.

The operable portion 33 corresponds to the switches 21 described above, and the input detector 34 corresponds to the input detector that detects whether the switches 21 described above are pressed. In the operating unit 1, the switch controller 35 is connected to the input detector 34 and the light emitting boards 14.

In the operating unit 1A, the switch controller 35 is connected to the input detector 34, the light emitting boards 14, and the emission control boards 26.

In the operating unit 1, the light presenter 36 includes the first light emitter 12 and the light emitting boards 14 described above. In the operating unit 1A, the light presenter 36 includes the first light emitter 12, the light emitting boards 14, the second light emitter 23, and the emission control boards 26.

Figure 12:
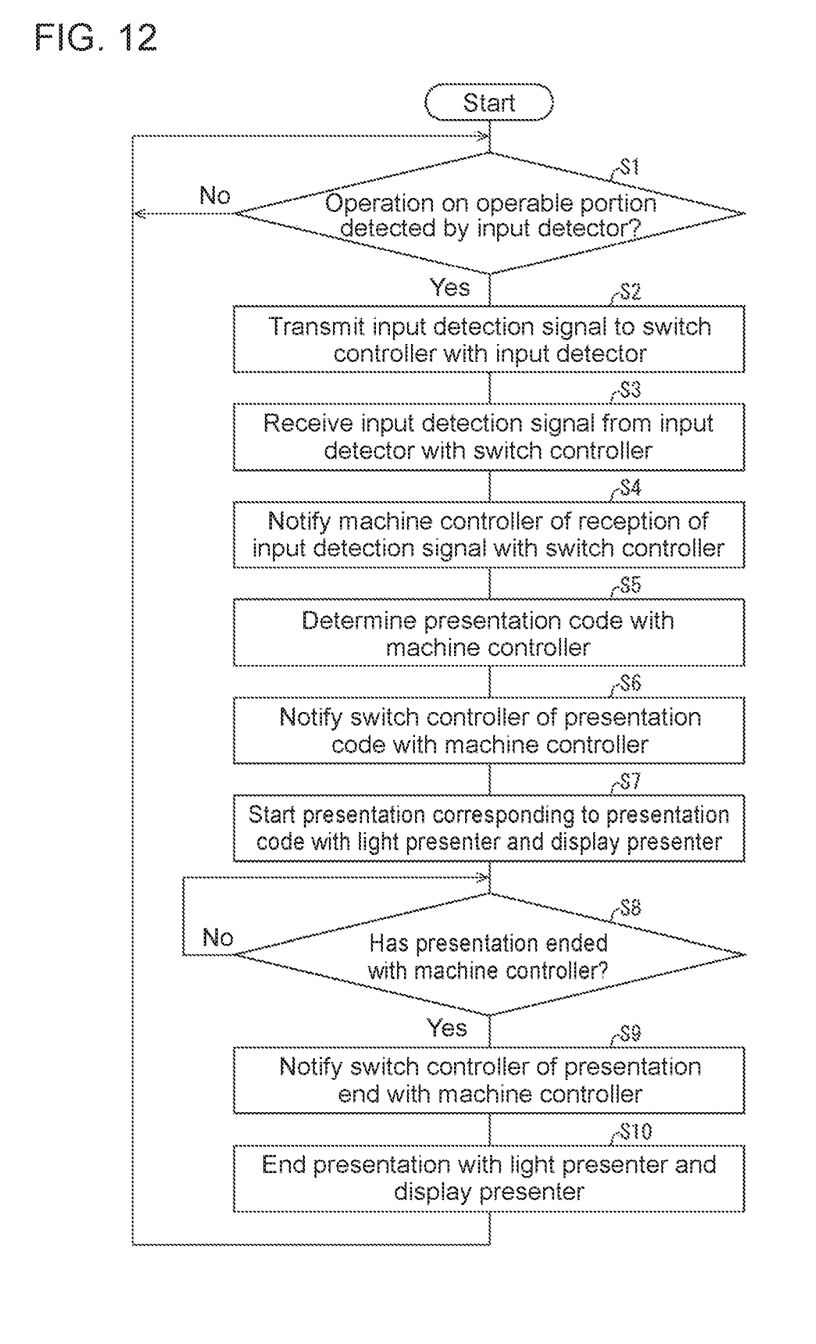
FIG. 12 is a flowchart illustrating a basic procedure for presentation performed between an operating unit according to a first embodiment or a second embodiment, or other embodiments, and an amusement machine.

As shown in FIG. 12, the input detector 34 constantly detects any operation on the operable portion 33 (S1). In response to an operation on the operable portion 33 by a player, the input detector 34 detects the operation (Yes in S1) and transmits an input detection signal indicating that the operation is detected to the switch controller 35 (S2). The switch controller 35 receives the input detection signal (S3) and notifies the machine controller 37 of reception of the input detection signal (S4). In response, the machine controller 37 determines a presentation code (S5). The machine controller 37 uses functions assigned to the switches 21 as one of factors for determining the presentation code.

In response to the determination of the presentation code, the machine controller 37 notifies the switch controller 35 of the determined presentation code (S6). The display presenter 38 included in the amusement machine 30 and the light presenter 36 included in the operating unit 1 then start the presentation corresponding to the determined presentation code (S7).

After the presentation starts, the machine controller 37 constantly determines whether to end the presentation (S8). When a player performs a predetermined operation on the operable portion 33 to determine the end of the presentation, or a predetermined time elapses after the start of the presentation, the end of the presentation is determined (Yes in S8). The switch controller 35 is notified of the end of the presentation (S9). The presentation thus ends (S10) in the display presenter 38 included in the amusement machine 30 and the light presenter 36 included in the operating unit 1. The processing returns to S1. In S8, when the presentation ends after the predetermined time elapses, the processing returns to S1 to wait for an operation on the operable portion 33 for the next game. In contrast, in response to an operation on the spin button to start the next game in S8, the determination result in S1 is Yes, and the processing advances to S2.

3. Modifications

One or more embodiments described in detail above are mere examples of one or more embodiments in all respects. The embodiment may be variously modified or altered without departing from the scope. For example, the embodiments can be modified in the forms described below. The same components as those in the above embodiments are hereafter given like reference numerals, and the operations that are the same as those in the above embodiments will not be described. The modifications described below can be combined as appropriate.

For example, although the light emitting boards 14 are located at both ends of the light guide plate 13 with a rectangular shape in the transverse direction of the light guide plate 13, the light emitting boards 14 may be located to face each other in the longitudinal direction or may be located on each of the four sides of the rectangular shape or on one of any sides of the rectangular shape.

Although the second light emitter 23 in the illustrated example has the structure including the multiple light emitting elements 25 in a row in the depth direction in a plan view, the structure is not limited to the row arrangement. For example, multiple transparent boards 24 may be stacked with the light emitting elements 25 mounted on each transparent board 24 being misaligned and including portions that do not overlap each other as viewed in plan. The multiple light emitting elements 25 arranged in the depth direction may be inclined to the depth direction.

The embodiments described above should not be construed to be restrictive but may be modified within the spirit and scope of the claimed disclosure. The technical features disclosed in different embodiments may be combined in other embodiments within the technical.

The invention claimed is:

1. An operating unit, comprising: a base; and an operable portion on the base, wherein the base comprises a first light emitter comprising at least one light guide plate, a light emitting surface of which has a finely processed pattern, the light emitting surface facing a front surface of the operating unit, and a light emitting board on an end face of the at least one light guide plate in a thickness direction, the light emitting board being configured to apply light from a plurality of light sources to the end face of the at least one light guide plate; and a second light emitter comprising at least one transparent board stacked on the at least one light guide plate, the at least one transparent board having a surface on which a plurality of light emitting elements are mounted.

2. The operating unit according to claim 1, wherein
the first light emitter comprises a plurality of the light guide plates, and
the plurality of light guide plates comprises different patterns and are stacked on one another.

3. The operating unit according to claim 1,
the base comprises
wherein the base comprises a light control board configured to control light emission of the plurality of light emitting elements.

4. The operating unit according to claim 3, wherein
the second light emitter comprises a plurality of transparent boards, and
a transparent plate is located between adjacent transparent boards of the plurality of transparent boards to maintain a spacing between the adjacent transparent boards.

5. The operating unit according to claim 1, wherein
the base comprises
a first mirror located adjacent to a light emission surface of the first light emitter to reflect and transmit light, and
a second mirror located adjacent to a back surface of the first light emitter to reflect light.

6. The operating unit according to claim 3, wherein
the base comprises
a first mirror located adjacent to a light emission surface of each of the first light emitter and the second light emitter to reflect and transmit light, and
a second mirror located adjacent to a back surface of each of the first light emitter and the second light emitter to reflect light.

7. An amusement machine, comprising:
the operating unit according to claim 1.

8. The operating unit according to claim 2,
wherein the base comprises
a light control board configured to control light emission of the plurality of light emitting elements.

9. The operating unit according to claim 2, wherein
the base comprises
a first mirror located adjacent to a light emission surface of the first light emitter to reflect and transmit light, and
a second mirror located adjacent to a back surface of the first light emitter to reflect light.

10. The operating unit according to claim 4, wherein
the base comprises
a first mirror located adjacent to a light emission surface of each of the first light emitter and the second light emitter to reflect and transmit light, and a second mirror located adjacent to a back surface of each of the first light emitter and the second light emitter to reflect light.

11. An amusement machine, comprising:
the operating unit according to claim 2.

12. An amusement machine, comprising:
the operating unit according to claim 3.

13. An amusement machine, comprising:
the operating unit according to claim 4.

14. An amusement machine, comprising:
the operating unit according to claim 5.

15. An amusement machine, comprising:
the operating unit according to claim 6.

\* \* \* \* \*